United States Patent
Tsai

(10) Patent No.: US 8,185,844 B2
(45) Date of Patent: May 22, 2012

(54) ELECTRONIC DEVICE HAVING ON SCREEN DISPLAY AND METHOD FOR GENERATING ON SCREEN DISPLAY

(75) Inventor: Yuan-Hsi Tsai, Chung Ho (TW)

(73) Assignee: AmTRAN Technology Co., Ltd, Taipei County (TW)

( * ) Notice: Subject to any disclaimer, the term of this patent is extended or adjusted under 35 U.S.C. 154(b) by 641 days.

(21) Appl. No.: 12/193,783

(22) Filed: Aug. 19, 2008

(65) Prior Publication Data

US 2009/0319953 A1    Dec. 24, 2009

(30) Foreign Application Priority Data

Jun. 20, 2008   (TW) .............................. 97123196 A

(51) Int. Cl.
*G06F 3/048* (2006.01)
(52) U.S. Cl. .......................... 715/841; 715/854; 715/810
(58) Field of Classification Search .................. 715/810, 715/828, 841, 853, 854
See application file for complete search history.

(56) References Cited

U.S. PATENT DOCUMENTS

| | | | |
|---|---|---|---|
| 7,644,374 B2 * | 1/2010 | Wong et al. .................... | 715/853 |
| 7,669,146 B2 * | 2/2010 | Lauff ............................. | 715/854 |
| 7,694,239 B2 * | 4/2010 | Swain et al. ................... | 715/854 |
| 7,788,599 B2 * | 8/2010 | Michaud et al. ............... | 715/810 |
| 2003/0007010 A1 * | 1/2003 | Ullmann et al. ............... | 345/810 |
| 2005/0005241 A1 * | 1/2005 | Hunleth et al. ................ | 715/720 |
| 2006/0031776 A1 * | 2/2006 | Glein et al. .................... | 715/779 |

* cited by examiner

*Primary Examiner* — Xiomar L Bautista
(74) *Attorney, Agent, or Firm* — Stevens & Showalter LLP

(57) ABSTRACT

An electronic device having an on screen display (OSD) and a method for generating the OSD are described, for generating an OSD in an electronic device, so as to reduce the display area of the OSD. The method comprises the steps of selecting a function menu, and drawing a display layer of the function menu and a display layer of each function item in the function menu on a display frame of a display; selecting a function item from the current function menu; only drawing the display layer of the selected function item and removing the display layers of the unselected ones; and when the selected function item further includes another function menu, drawing a display layer of each function item in the function menu.

13 Claims, 15 Drawing Sheets

ELECTRONIC DEVICE HAVING ON SCREEN DISPLAY AND METHOD FOR GENERATING ON SCREEN DISPLAY

CROSS-REFERENCE TO RELATED APPLICATIONS

This non-provisional application claims priority under 35 U.S.C. §119(a) on Patent Application No(s). 097123196 filed in Taiwan, R.O.C. on Jun. 20, 2008 the entire contents of which are hereby incorporated by reference.

BACKGROUND OF THE INVENTION

1. Field of Invention

The present invention relates to an electronic device having an on screen display (OSD) and a method for generating the OSD, and more particularly to a generating method capable of reducing the display area of the OSD.

2. Related Art

In many electronic products, an on screen display (OSD) is provided for a user to adjust relative environmental parameters. The OSD contains function items of a certain electronic product. Taking a TV set for example, in order to adjust the display environment of the TV set, its OSD is usually provided with brightness, contrast, color, saturation, channel fine tuning, and on-off time setting.

FIG. 1 is a schematic view of a conventional OSD on a display frame. Referring to FIG. 1, an opaque OSD 110 is further provided by the conventional OSD on the display frame 100. All the function items 111 are disposed in the OSD 110. As the OSD 110 provides multiple function items 111 at the same time, it occupies a part of the display frame 100. Besides, the OSD 110 is opaque, and thus the user is unable to view the display frame simultaneously during the adjustment. In addition, the conventional OSD 110 can only be displayed on the same position of the display frame 100, so that it is quite easy to continuously block the part of the display frame from the user.

SUMMARY OF THE INVENTION

In order to solve the above problem, the present invention is directed to an electronic device having an on screen display (OSD), used for generating an OSD in an electronic device, so as to increase the viewable region on a display frame of the electronic device.

Therefore, an electronic device having an OSD, including an image signal receiving unit, a display, and a microprocessor is provided. The image signal receiving unit is used for receiving a plurality of image signals. The display is used for playing images and displaying a function menu. The microprocessor is electrically connected to the image signal receiving unit and the display, for executing a function selection procedure. The function selection procedure comprises the following steps: selecting the function menu, drawing a display layer of the function menu and a display layer of each function item in the function menu on a display frame of the display, and overlapping the display layer of the function menu with the display layers of the function items; selecting a function item from the current function menu according to an operation of a user; and when the selected function item further comprises another sub-function menu, drawing a display layer of each sub-function item in the sub-function menu, maintaining the display layer of the selected function item, and removing the display layers of the unselected function item.

The present invention is also directed to an electronic device having an OSD, used for generating an OSD in an electronic device, so as to increase the viewable region on a display frame of the electronic device.

Therefore, an electronic device having an OSD, including an image signal receiving unit, a display, a microprocessor, a storage unit, and a controller, is provided. The image signal receiving unit is used for receiving a plurality of image signals. The display is used for playing display images and displaying a function menu. The microprocessor is electrically connected to the image signal receiving unit, the display, and the storage unit, for executing a function selection procedure. The function selection procedure includes selecting the function menu, drawing a display layer of each function item in the function menu on a display frame of the display; selecting a function item from the current function menu according to an operation of a user; and when the selected function item further includes another sub-function menu, drawing a display layer of each sub-function item in the sub-function menu, maintaining the display layer of the selected function item, and removing the display layers of the unselected ones.

The present invention is also directed to a method for generating an on screen display (OSD), adapted to generate function items of an OSD in an electronic device, so as to increase the viewable region on a display frame of the electronic device. When operating the function menu, the user may select an appropriate display region for displaying the function menu according to image variations on the display frame.

Therefore, the method comprises the following steps: selecting a function menu, drawing a display layer of the function menu and a display layer of each function item in the function menu, and overlapping the display layer of the function menu with the display layers of the function items; executing a function item in the current function menu; only drawing the display layer of the selected function item and removing the display layers of the unselected function items; and when the selected function item further comprises another function menu, drawing a display layer of each item in the function menu.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Figure 1:
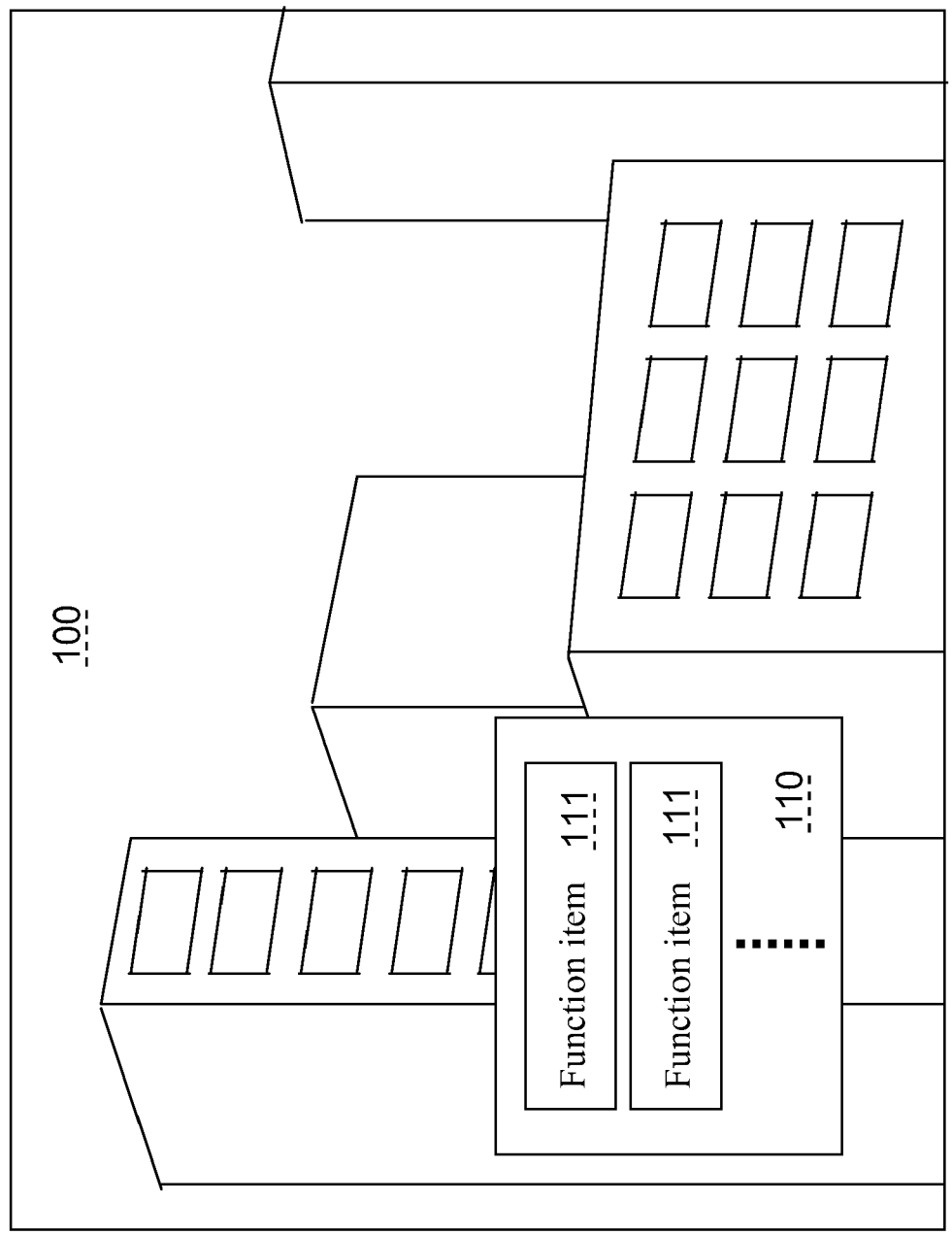
FIG. 1 is a schematic view of a conventional OSD on a display frame.
Figure 2:
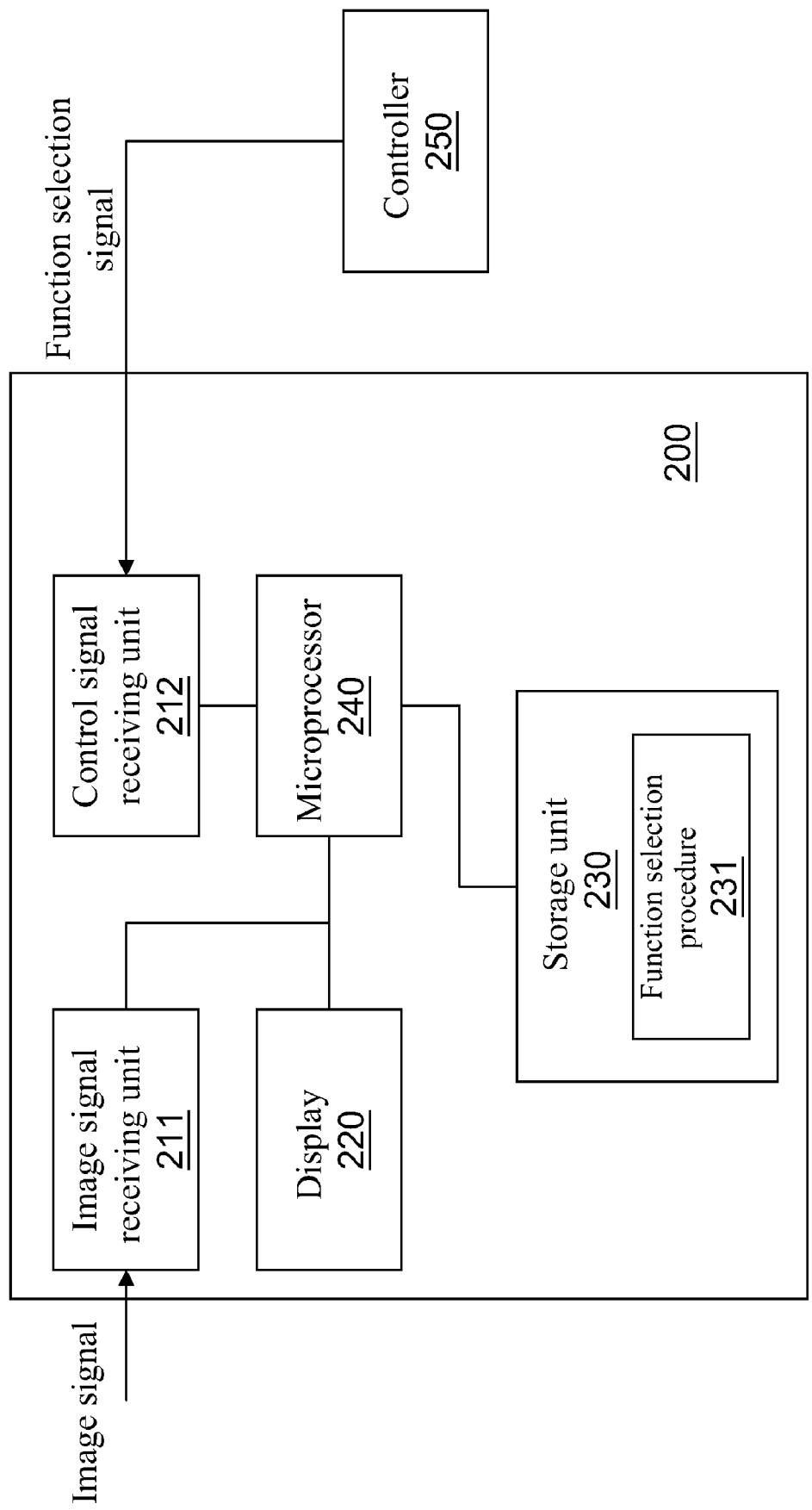
FIG. 2 is a schematic view illustrating the architecture of the present invention.

FIG. 2 is a schematic view illustrating the architecture of the present invention. Referring to FIG. 2, an electronic device 200 having an OSD is provided. In this embodiment, the electronic device 200 is a digital TV set, but those skilled in the art may apply the present invention to other electronic devices, and the details will not be given herein again.

The electronic device 200 having the OSD of the present invention includes an image signal receiving unit 211, a control signal receiving unit 212, a display 220, a storage unit 230, and a microprocessor 240. The image signal receiving unit 211 is electrically connected to the microprocessor 240, for receiving a plurality of image signals. The image signals are displayed (played) digital video signals converted from analog video signals by an analog to digital converter (A/D converter), but the present invention is not limited herein.

The display 220 is electrically connected to the microprocessor 240, for playing images and displaying a function menu. The storage unit 230 is electrically connected to the image signal receiving unit 211, for storing digital images and a function selection procedure 231. The storage unit 230 may be a read only memory (ROM), a flash memory, or a hard disk drive, etc., and a corresponding storage device can be provided according to different electronic devices. A controller 250 is used for transmitting a function selection signal, so as to select the function item to be executed. The controller 250 may be, but not limited to, a keyboard or a remote controller.

The microprocessor 240 is connected to the display 220, the A/D converter, a video processor, and the control signal receiving unit 212. After the microprocessor 240 receives the function selection signal transmitted from the controller 250 through the control signal receiving unit 212, the microprocessor 240 draws display layers of the function menu corresponding to the number of the function items in the function menu. The microprocessor 240 draws a plurality of display layers (i.e., the display layers of the function items), and arranges the display layer of each function item in sequence, so as to draw the corresponding function menu on the display 220. After the microprocessor 240 generates the function menu, the video processor receives and displays the function menu on a video frame for the user to operate.

When the controller 250 transmits a control signal, the microprocessor 240 receives the control signal through the control signal receiving unit 21 and processes the received control signal. In order to facilitate the user viewing the selected function item, an image overlap is performed on the currently selected function item through a color mask, so as to highlight the display layer of the selected function item. In addition to the function item to be executed, the function item of this embodiment may be another set of function menu.

Figure 3:
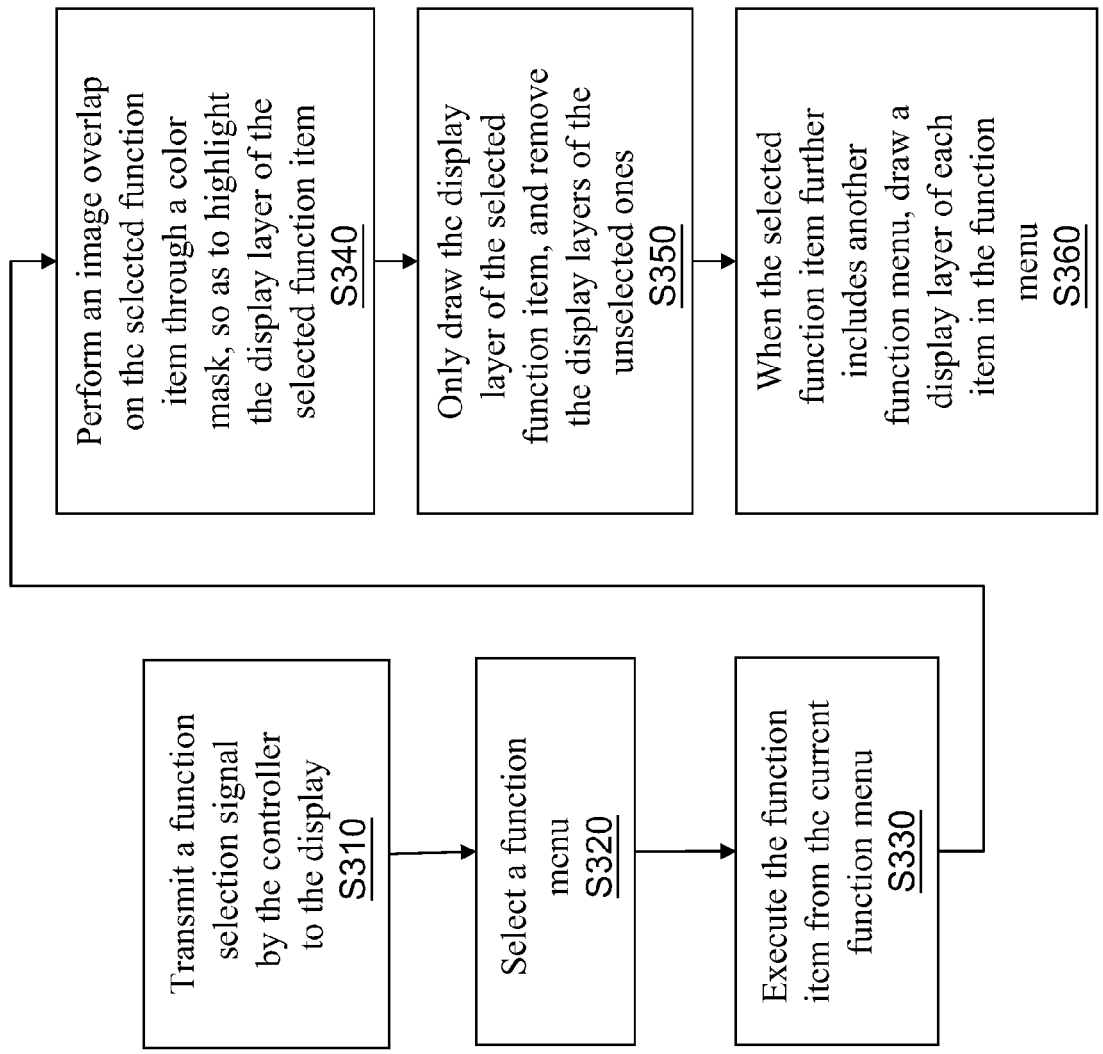
FIG. 3 is a schematic view of an operating process of the present invention.

In addition, in another preferred embodiment, the function selection procedure 231 described as follows may be employed to reduce the display area taken up by the function menu. FIG. 3 is a schematic view of an operating process of the present invention. Referring to FIG. 3, first, the controller transmits a function selection signal to the display (Step S310), and the display 220 selects a function item from the function menu on receiving the function selection signal. Then, the function menu is selected (Step S320), and a display layer of the function menu and a display layer of each function item in the function menu are drawn on a display frame of the display 220. After that, the microprocessor 240 overlaps the display layer of the function menu with the display layers of the function items into one image.

Next, the function item from the current function menu is executed (Step S330). An image overlap is performed on the selected function item through a color mask, so as to highlight the display layer of the selected function item (Step S340). Only the display layer of the selected function item is drawn, and the display layers of the unselected ones are removed (Step S350). When the selected function item further includes another function menu, a display layer of each item in the function menu is drawn (Step S360).

The display layer of the function item is composed of text and background. The text in the display layer refers to characters displayed for the user to read. The background of the display layer may be opaque or drawn corresponding to the display frame, so that the interference of the display layer of the function item on the display frame is reduced and the text part is highlighted.

In order to clearly describe the operating process of the present invention, an embodiment below is provided for illustration. For example, this embodiment includes a preset function menu 400, a first function menu 410, a second function menu 420, and a third function menu 430.

Figure 4A:
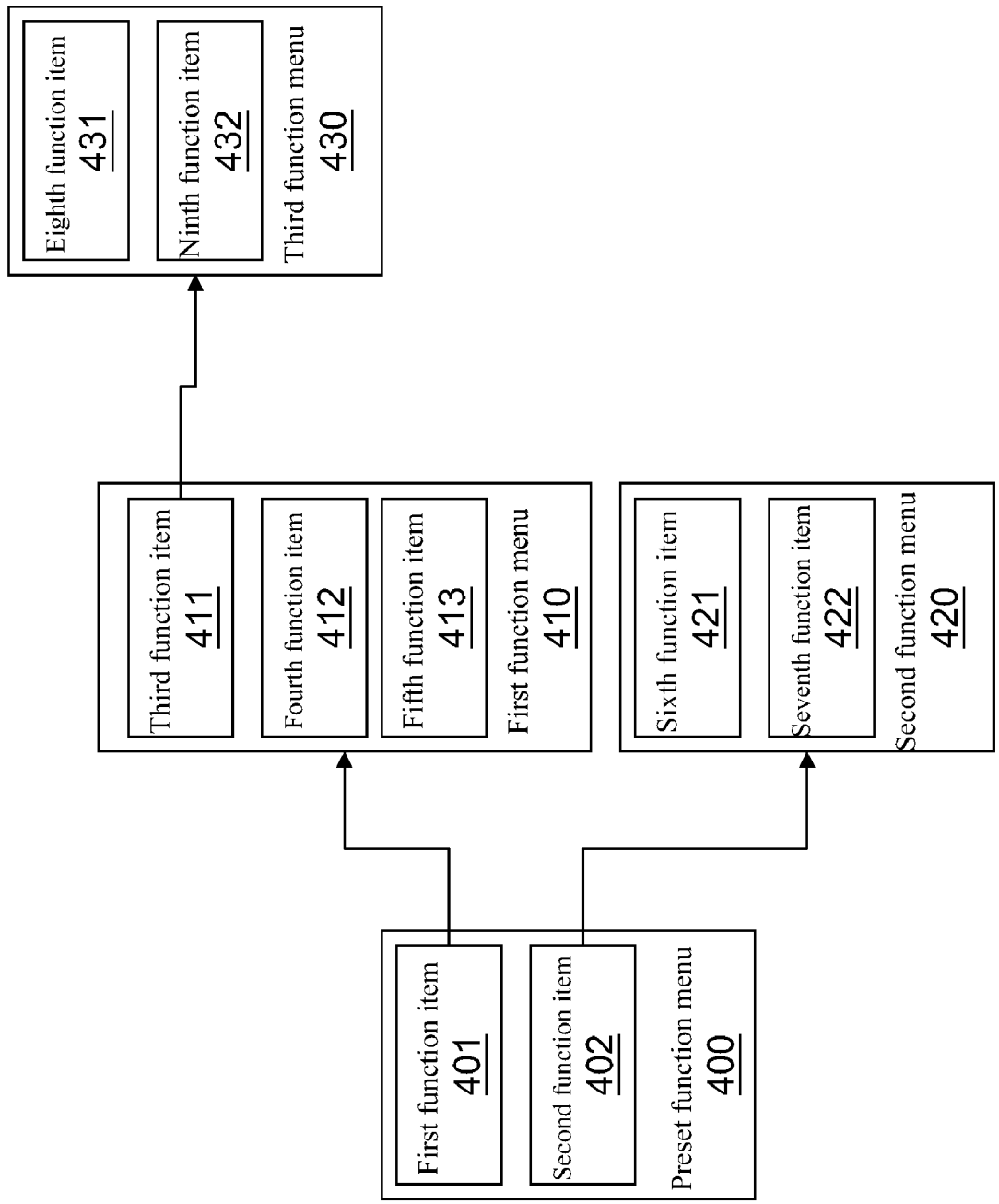
FIG. 4a is a schematic view illustrating the relations between each function menu in an embodiment.

FIG. 4a is a schematic view illustrating the relations between each function menu in this embodiment. Referring to FIG. 4a, the preset function menu 400 includes a first function item 401 and a second function item 402. The first function item 401 is used for activating the first function menu 410, and the second function item 402 is used for activating the second function menu 420. The first function menu 410 includes a third function item 411, a fourth function item 412 and a fifth function item 413, and the third function item 411 is used for activating the third function menu 430. The second function menu 420 includes a sixth function item 421, and a seventh function item 422. The third function menu 430 includes an eighth function item 431 and a ninth function item 432.

Figure 4B:
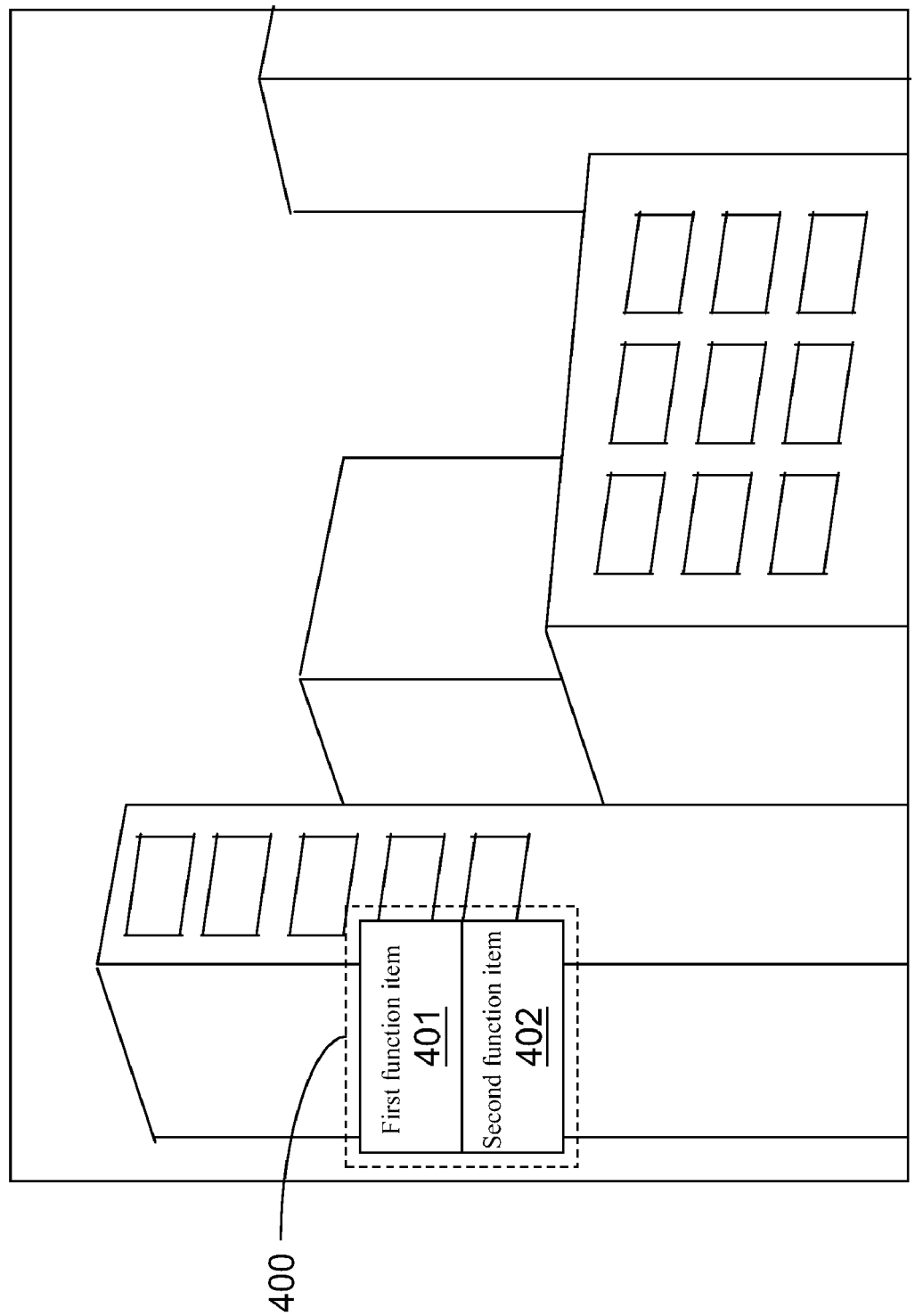
FIG. 4b is a schematic view of a preset function menu.
Figure 4C:
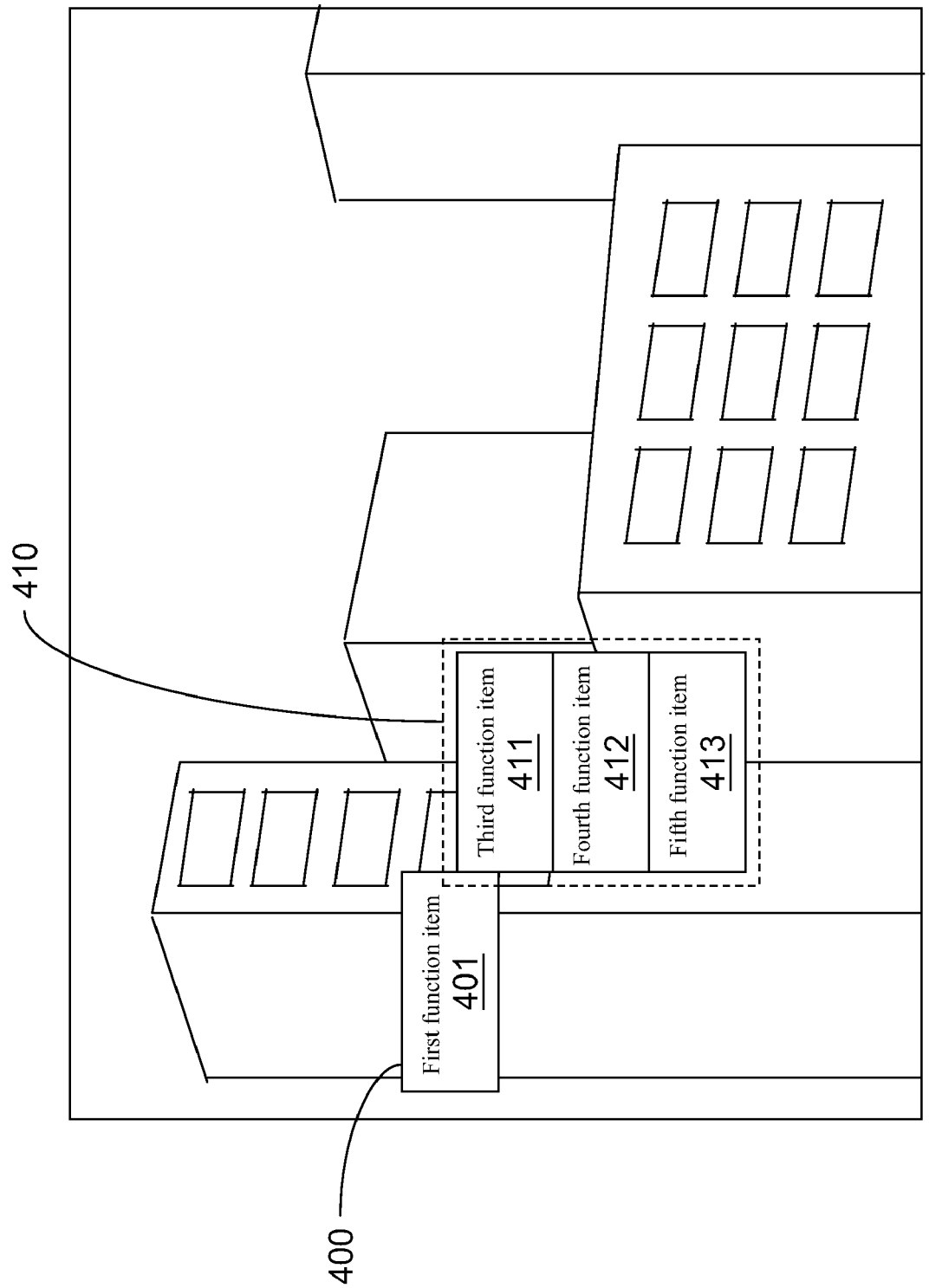
FIG. 4c is a schematic view of a first function menu.

After the preset function menu 400 is activated by the user, the microprocessor 240 draws a display layer of each function item in the preset function menu 400. FIG. 4b is a schematic view of the preset function menu 400 on a display frame. However, in the present invention, the display position of the preset function menu 400 on the display is not particularly limited. The preset function menu 400 is marked up by a black dashed line block for the ease of description. Each function item in the preset function menu 400 can be selected by the user through the controller 250. It is assumed that the first function item 401 is selected by the user, so that the microprocessor 240 removes the display layers of other function items from the preset function menu 400, and only maintains the display layer of the first function item 401. For a program developer, the display layers may be removed from the preset function menu 400 by a function of removing or erasing the layers. Next, a display layer of the third function item 411, a display layer of the fourth function item 412 and a display layer of the fifth function item 413 in the first function menu 410 are drawn. Referring to FIG. 4c, a schematic view of the first function menu is shown. As such, the region on the display frame blocked by the preset function menu 400 is reduced, and the display range of the preset function menu 400 is further reduced.

Figure 4D:
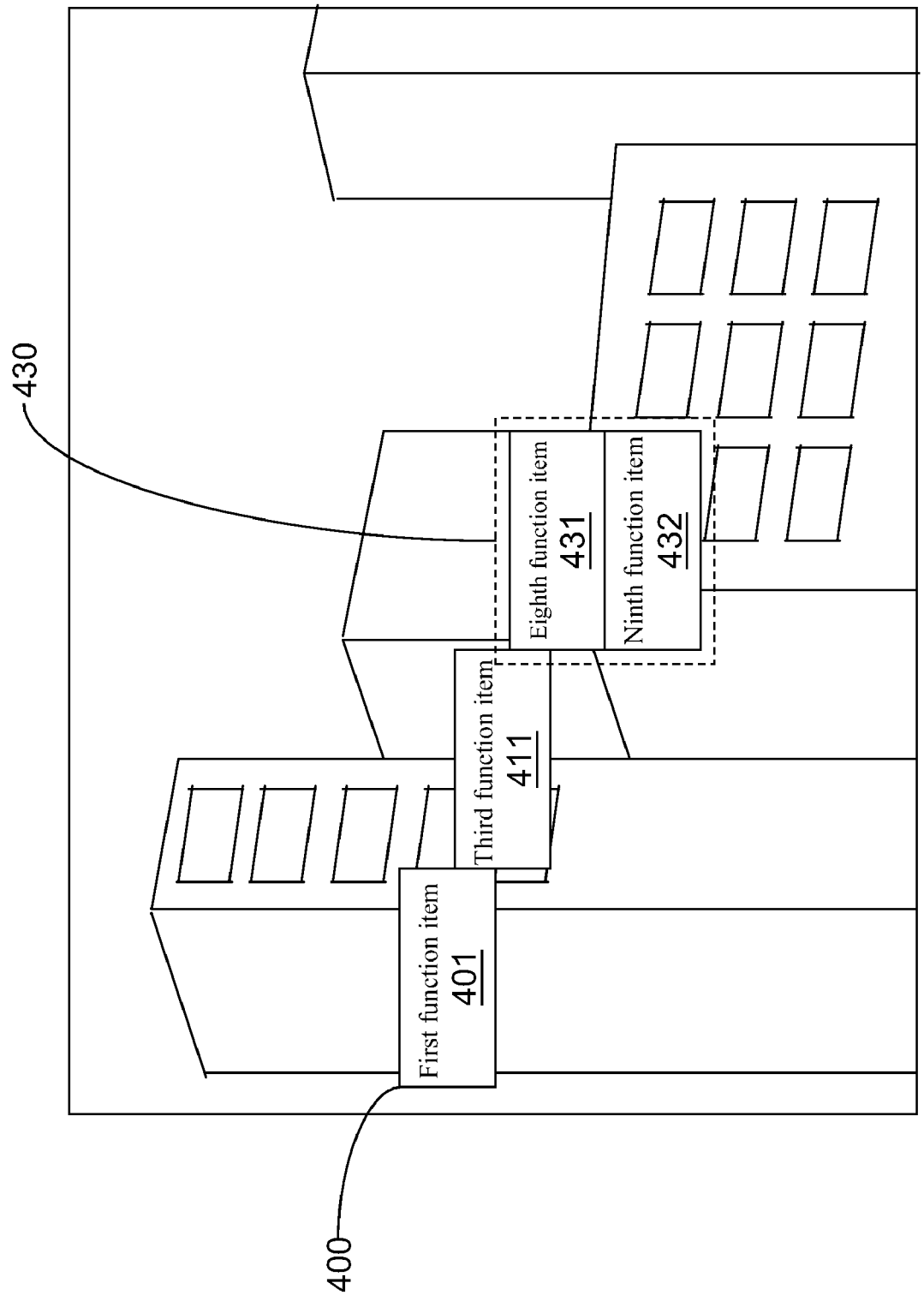
FIG. 4d is a schematic view of a third function menu.

Further, if the third function item 411 in the first function menu 410 is activated by the user, the microprocessor 240 removes the display layers of other function items in the first function menu 410, and maintains only the display layer of the third function item 411. At this time, only the display layer of the first function item 401 is maintained in the preset function menu 400. The microprocessor 240 may draw the display layer of the eighth function item 431 and the display layer of the ninth function item 432 in the third function menu 430. Referring to FIG. 4*d*, a schematic view of the third function menu 430 is shown.

Figure 4E:
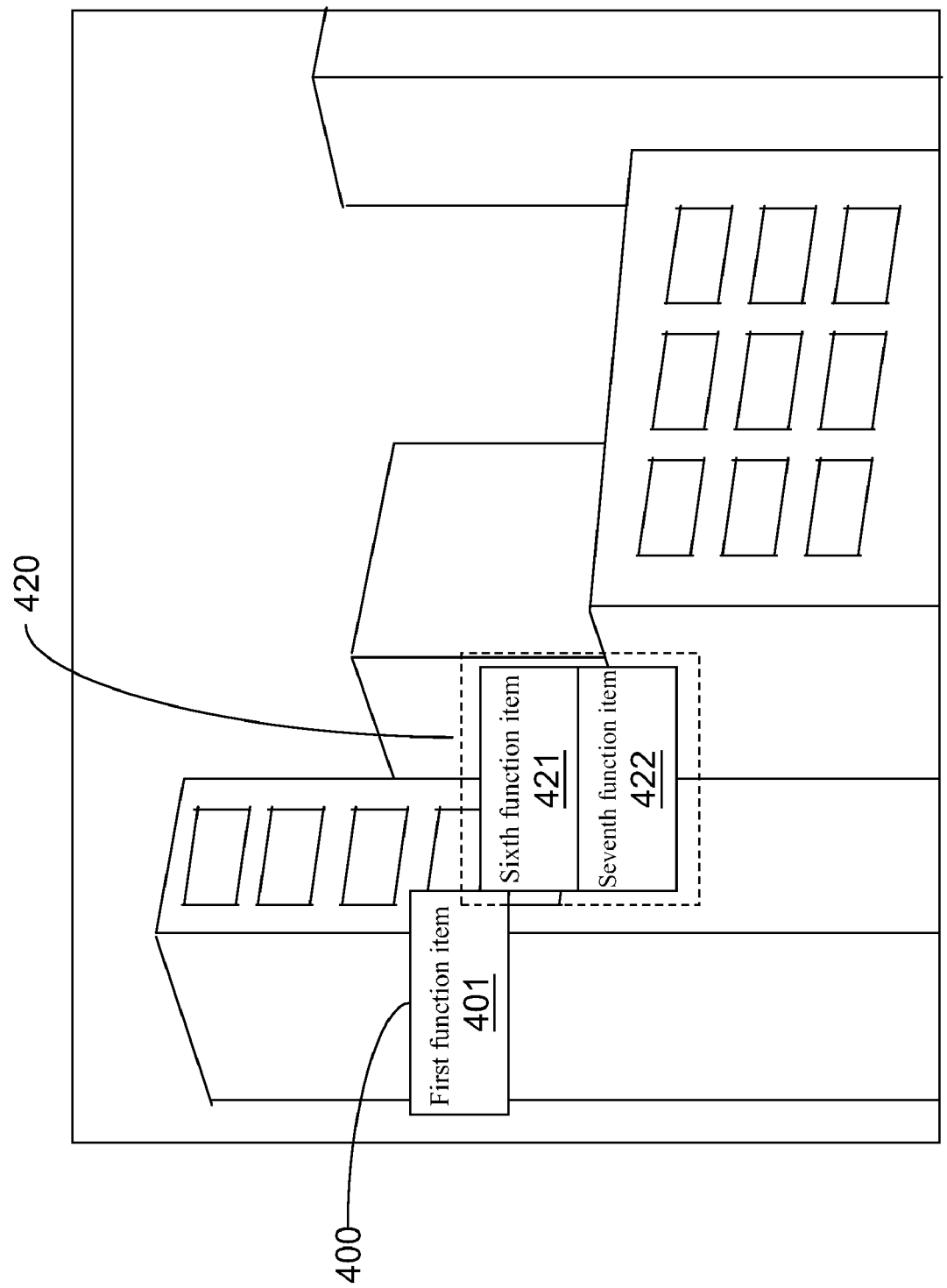
FIG. 4e is a schematic view of a second function menu.

When the user returns to the first function menu 410 from the third function menu 430, the microprocessor 240 removes the display layer of each function item in the third function menu 430, and draws the display layer of each function item in the first function menu 410. Similarly, when the second function menu 420 is to be executed, the microprocessor 240 draws the display layer of the second function item 402 and the display layer of each function item in the second function menu 420. Referring to FIG. 4*e*, a schematic view of the second function menu 420 is shown.

In another embodiment of the present invention, the connection and the data transmission relation between each element in the electronic device 200 are similar to those of the above embodiment, so the details will not be described herein again. However, compared with the above embodiment, this embodiment differs in the process of the function selection procedure 231.

Figure 5:
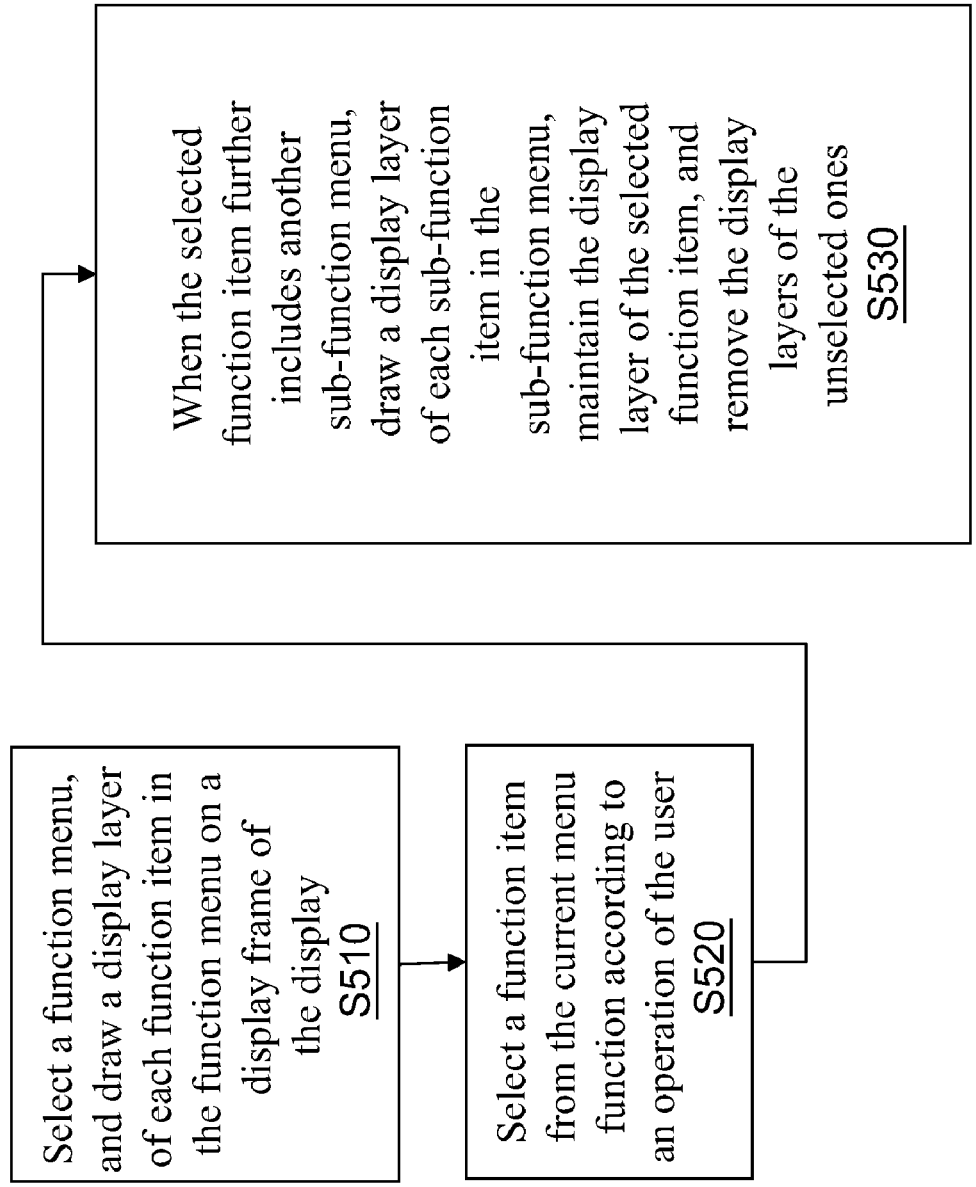
FIG. 5 is a schematic view of an operating process of a function selection procedure in another embodiment.

Referring to FIG. 5, the function selection procedure 231 includes the following steps. First, a function menu is selected, and a display layer of each function item in the function menu is drawn on a display frame of the display (Step S510). In this embodiment, each function menu includes the display layer of at least one function item. That is, the function menu is a display collection of the display layers of the function items. The hierarchy architectures of the preset function menu 400, the first function menu 410, the second function menu 420, and the third function menu 430 are identical to those of the above embodiment.

Next, a function item is selected from the current function menu according to an operation of the user (Step S520). When the selected function item further includes another sub-function menu, a display layer of each sub-function item in the sub-function menu is drawn, the display layer of the selected function item is maintained, and the display layers of the unselected ones are removed (Step S530).

Figure 6A:
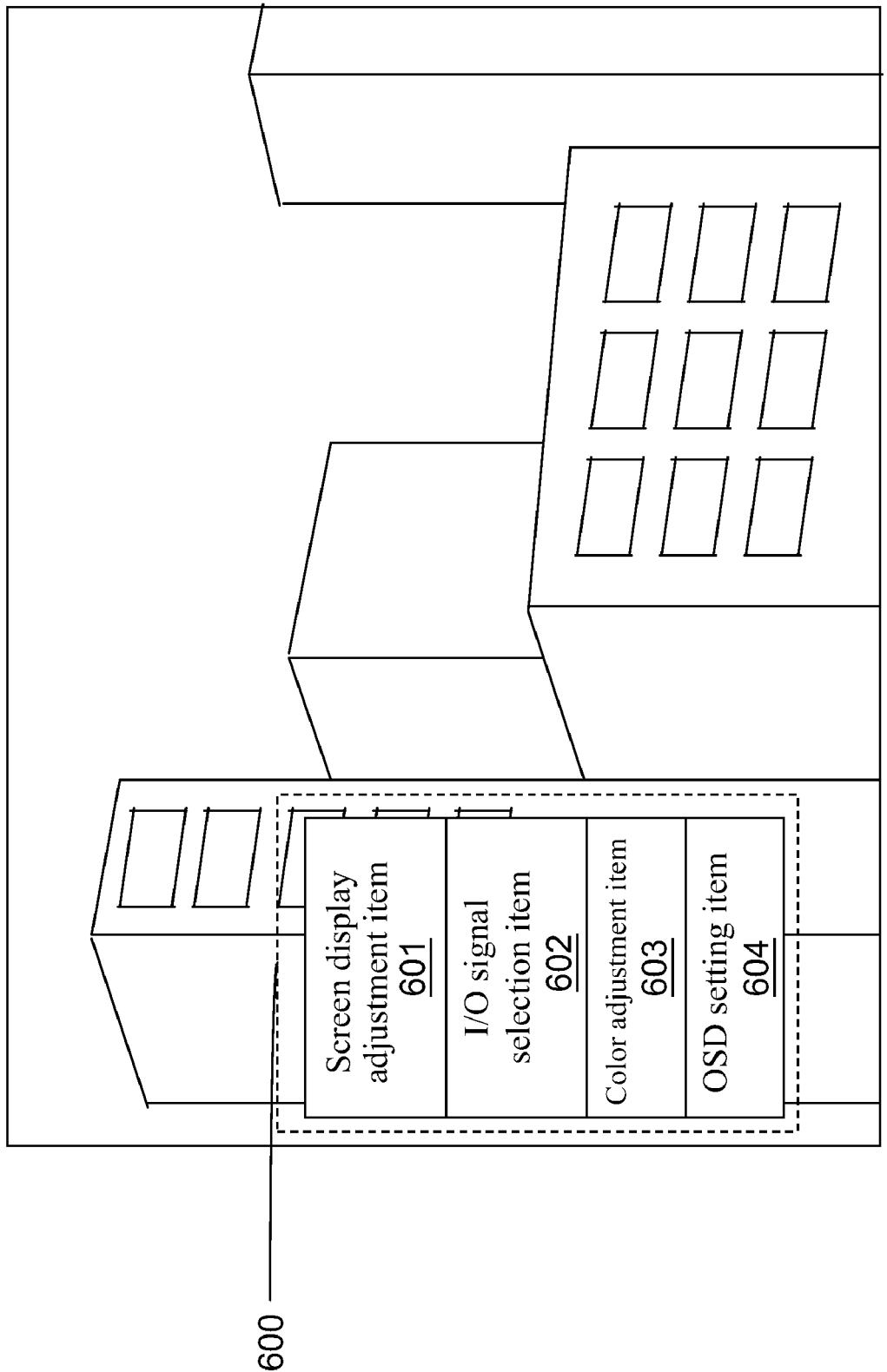
FIG. 6a is a schematic view of a TV OSD applied with the present invention.

Taking setting parameters of a TV frame for example, refer to FIG. 6*a*, a schematic view of a TV OSD applying the present invention is shown. The TV OSD 600 includes a screen display adjustment item 601, an I/O signal selection item 602, a color adjustment item 603, and an OSD setting item 604.

Figure 6B:
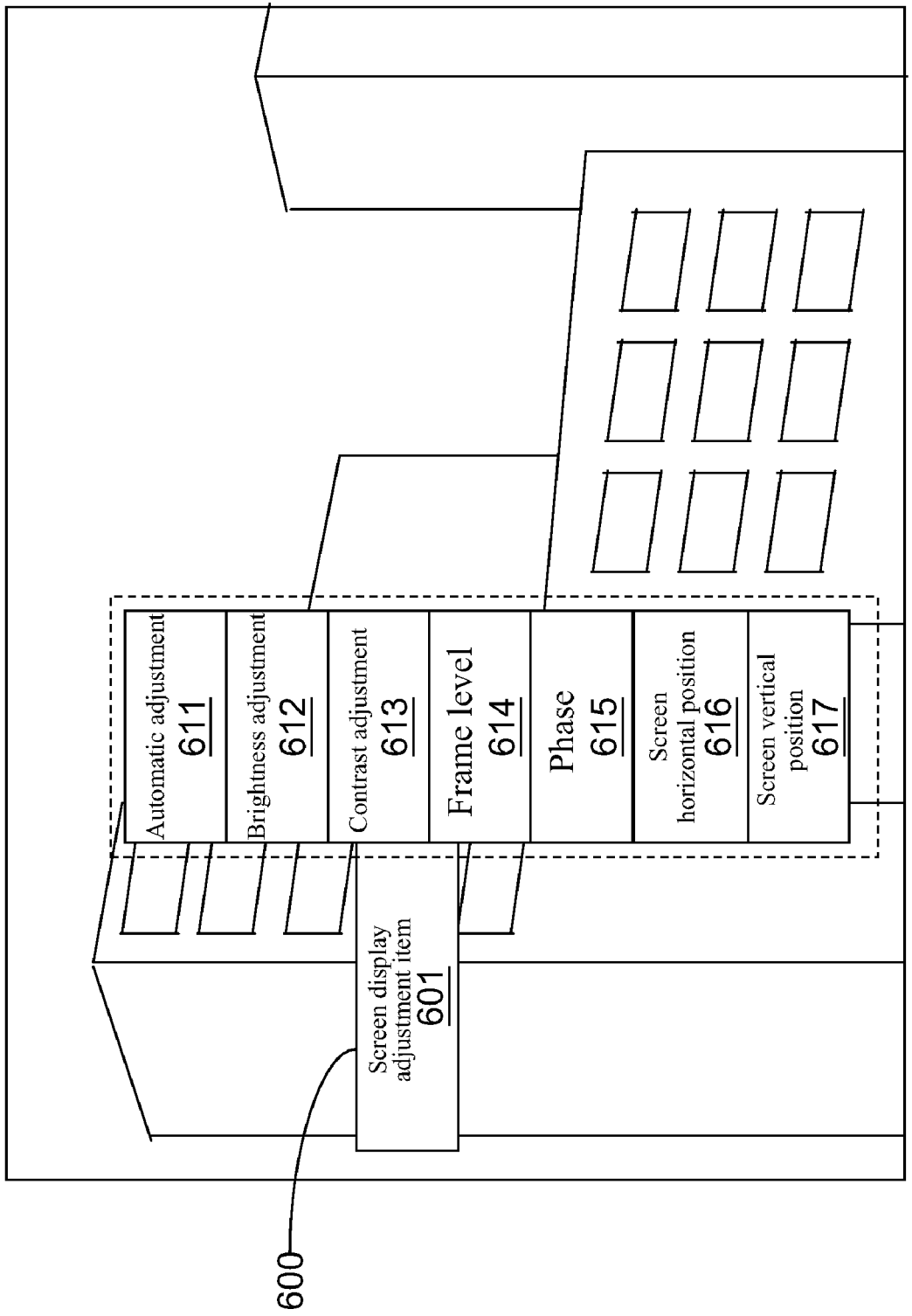
FIG. 6b is a schematic view of a screen display adjustment item.
Figure 6C:
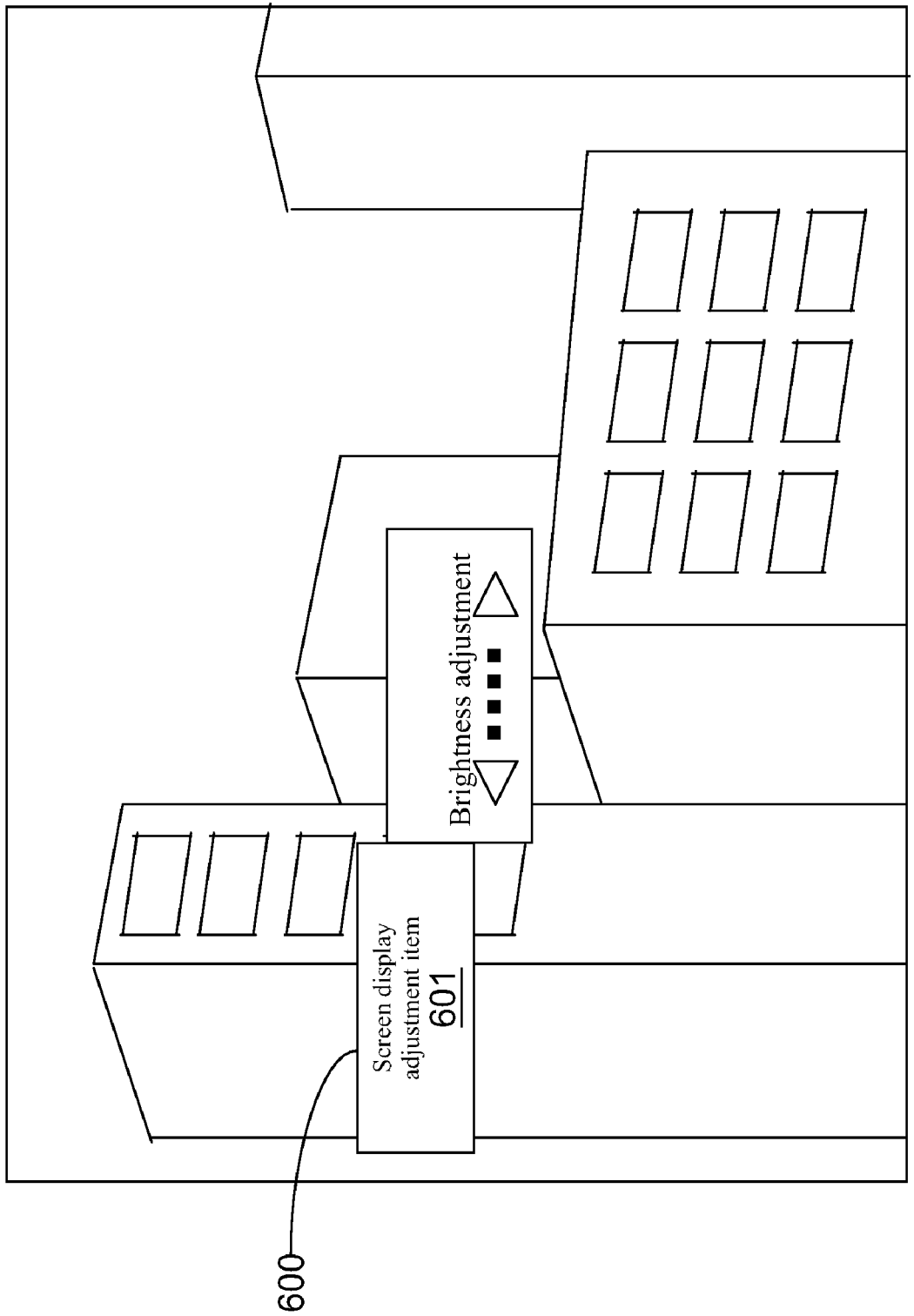
FIG. 6c is a schematic view of a brightness adjustment item.

After the screen display adjustment item 601 is selected by the user, the TV OSD 600 only draws a display layer of the screen display adjustment item 601 and removes the display layers of other function items. The screen display adjustment item 601 further includes the items of automatic adjustment 611, brightness adjustment 612, contrast adjustment 613, frame level 614, phase 615, screen horizontal position 616, and screen vertical position 617. The microprocessor 240 draws a display layer of each function item in the screen display adjustment item 601, and the display frame is shown in FIG. 6*b*. For example, when the item of brightness adjustment 612 is selected by the user, only the display layer of the brightness adjustment 612 is drawn on the display frame, and then the corresponding function is executed. Referring to FIG. 6*c*, a schematic view of the brightness adjustment is shown.

Figure 7A:
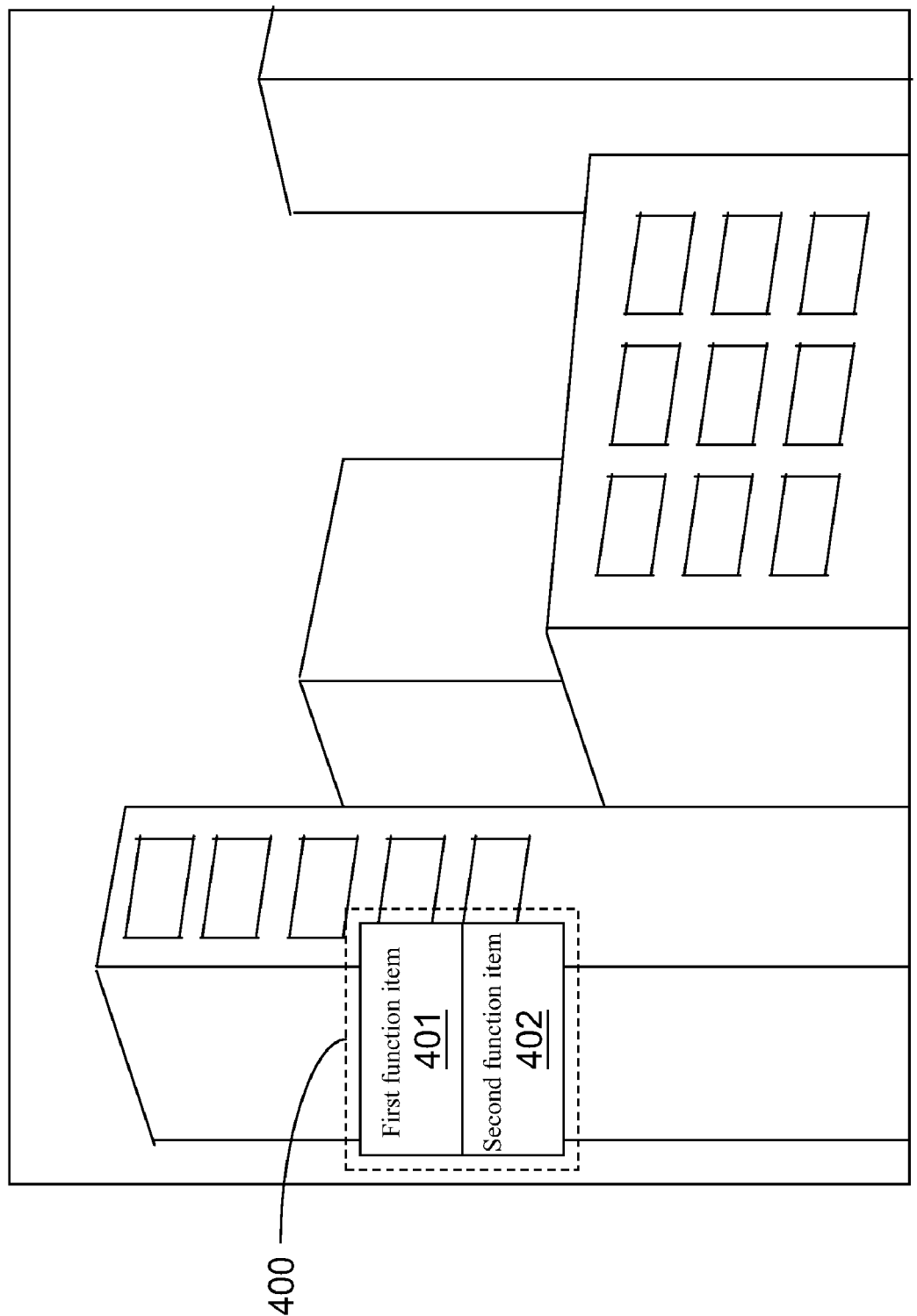
FIG. 7a to FIG. 7c are schematic views of another embodiment of the present invention.
Figure 7B:
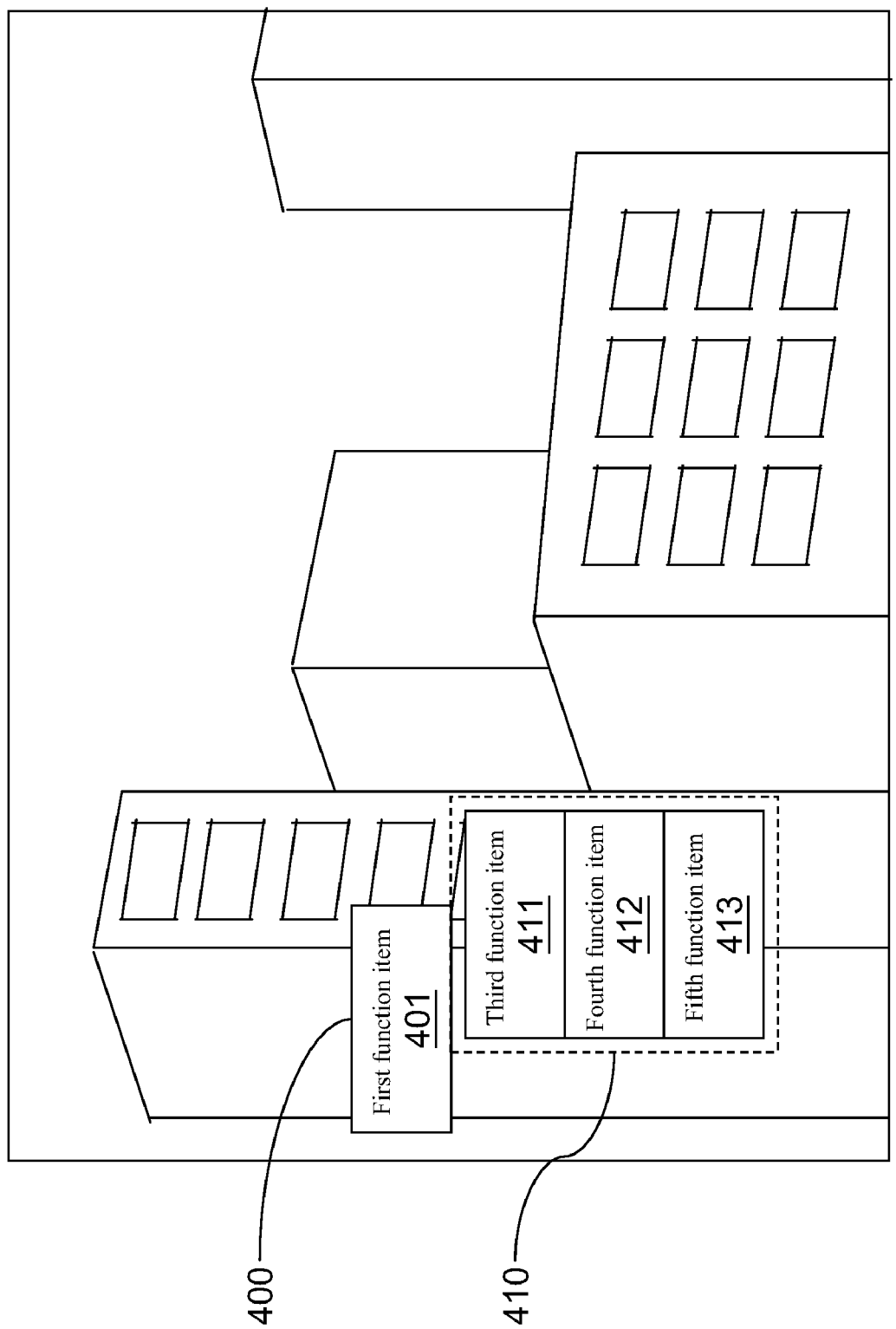
Figure 7C:
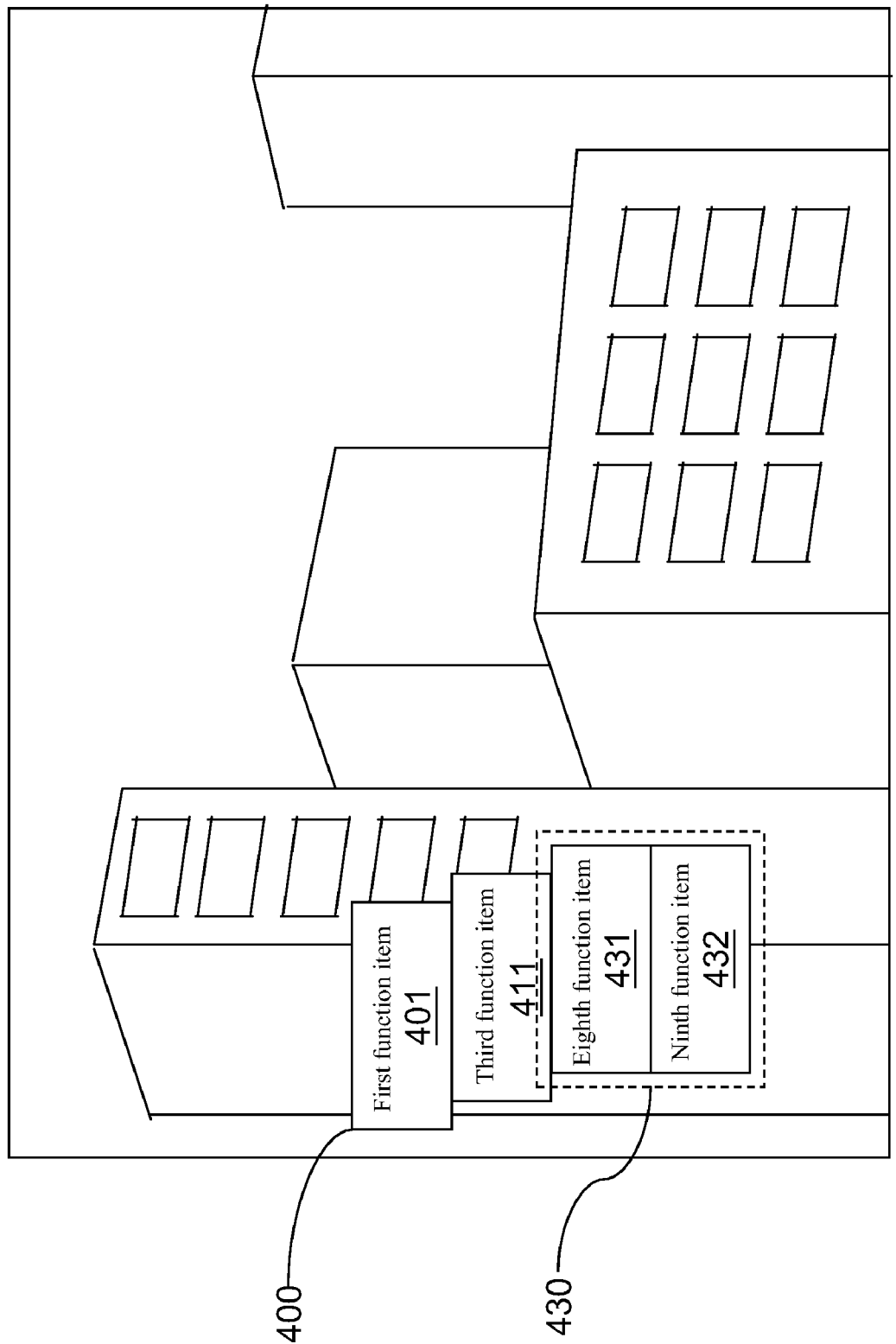

In addition to the displaying manners of the preset function menu 400 in the above embodiments, the preset function menu 400 of the present invention may also be displayed in the manner shown in FIG. 7*a*. When the first function item 401 is selected by the user, the microprocessor 240 removes the display layer of the second function item 402 from the preset function menu 400 on the display, and draws the display layers of the third function item 411, the fourth function item 412, and the fifth function item 413. In this manner, the region of the display frame blocked by the preset function menu 400 is reduced (referring to FIGS. 7*b* and 7*c*), and the display range of the preset function menu 400 is further reduced. Further, a method for displaying a function menu of an electronic device is also provided for increasing the viewable region on a display frame of the electronic device. Thereby, the function menu is prevented from blocking the display frame on the display 220 when operated by the user. In addition, in another embodiment of the present invention, it is possible to select an appropriate display region for displaying the function menu according to image variations on the display frame.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic device, comprising:
   an image signal receiving unit receiving a plurality of image signals;
   a display playing display images of the image signals and being capable of displaying a function menu, wherein the function menu comprises at least two function items; and
   a microprocessor, electrically connected to the image signal receiving unit and the display, for executing a function selection procedure of the function menu, wherein the function selection procedure comprises steps of:
   drawing at least two display regions on the display, each of the display region is shown with one of the function items;
   selecting one of the function items according to an operation of a user;
   removing the display region of the unselected function item while keeping the position of the display region of the selected function item unchanged; and
   when the selected function item further comprises at least one sub-function item, drawing at least one sub-function display region, each of the at least one sub-function display region is shown with one of the at least one sub-function item.

2. The electronic device according to claim 1, wherein the microprocessor performs an image overlap on the selected function item through a color mask, so as to highlight the display region of the selected function item.

3. The electronic device according to claim 1, further comprising a storage unit, electrically connected to the image signal receiving unit and the microprocessor, for storing the function selection procedure and the function item or the sub-function item.

4. The electronic device according to claim 1, further comprising a controller and a control signal receiving unit, wherein the controller is used for transmitting a function selection signal, and the control signal receiving unit is used for selecting one of the function items.

5. The electronic device according to claim 1, wherein the function selection procedure further comprises executing a function corresponding to the selected sub-function item.

6. An electronic device, comprising:
an image signal receiving unit receiving a plurality of image signals;
a display playing display images of the image signals and being capable of displaying a function menu, wherein the function menu comprises at least two function items; and
a microprocessor, electrically connected to the image signal receiving unit and the display, for executing a function selection procedure, wherein the function selection procedure comprises steps of:
drawing a display region on the display and showing the at least two function items of the function menu in the display region;
selecting one of the at least two function items according to an operation of a user;
removing the area of the display region of the unselected function item, and showing a reduced display region with the selected function item while keeping the position of the area of the selected function item unchanged; and
when the selected function item further comprises at least one sub-function, drawing a sub-function display region and showing the at least one sub-function item in the sub-function display region.

7. The electronic device according to claim 6, wherein the microprocessor performs an image overlap on the selected function item through a color mask, so as to highlight the display region of the selected function item.

8. The electronic device according to claim 6, further comprising a storage unit, electrically connected to the image signal receiving unit and the microprocessor, for storing the function selection procedure and the function item or the sub-function item.

9. The electronic device according to claim 6, further comprising a controller and a control signal receiving unit, wherein the controller is used for transmitting a function selection signal, and the control signal receiving unit is used for selecting one of the function items.

10. The electronic device according to claim 6, wherein the function selection procedure further comprises executing a function corresponding to the selected sub-function item.

11. A method for showing an on screen display (OSD) menu in a display device, wherein the OSD menu having at least two function items, the method comprising steps of:
drawing a first display region and showing the at least two function items of the OSD menu in the first display region;
selecting one of the at least two function items according to an operation of a user;
removing the area of the first display region of the unselected function item, and showing a second display region with the selected function item while keeping the position of the area of the selected function item unchanged, wherein the second display region is smaller than the first display region; and
when the selected function item further comprises at least one sub-function, drawing a third display region and showing the at least one sub-function in the third display region.

12. The method for showing the OSD menu in a display device according to claim 11, wherein the step of selecting the function menu further comprises receiving a function selection signal transmitted form a controller for selecting one of the function item from the function menu.

13. The method for showing the OSD menu in a display device according to claim 11, wherein the step of selecting the function item from the current function menu further comprises performing an image overlap on the selected function item through a color mask, so as to highlight the display region of the selected function item.

* * * * *